(12) United States Patent
Kawanishi et al.

(10) Patent No.: US 7,986,452 B2
(45) Date of Patent: Jul. 26, 2011

(54) HIGH-SPEED MULTIPLIED SIGNAL GENERATING METHOD AND DEVICE

(75) Inventors: Tetsuya Kawanishi, Koganei (JP); Takahide Sakamoto, Koganei (JP); Masahiro Tsuchiya, Koganei (JP)

(73) Assignee: National Institute Of Information And Communications Technology, Tokyo (JP)

( * ) Notice: Subject to any disclaimer, the term of this patent is extended or adjusted under 35 U.S.C. 154(b) by 0 days.

(21) Appl. No.: 12/440,241

(22) PCT Filed: Sep. 6, 2006

(86) PCT No.: PCT/JP2006/317640
§ 371 (c)(1),
(2), (4) Date: May 11, 2009

(87) PCT Pub. No.: WO2008/029455
PCT Pub. Date: Mar. 13, 2008

(65) Prior Publication Data
US 2010/0053732 A1    Mar. 4, 2010

(51) Int. Cl.
*G02F 2/02* (2006.01)
*G02F 1/35* (2006.01)
(52) U.S. Cl. ............... 359/328; 385/8; 385/9; 359/326
(58) Field of Classification Search .................. 385/1–3, 385/8, 9, 40; 359/326–332
See application file for complete search history.

(56) References Cited

U.S. PATENT DOCUMENTS

| | | | | |
|---|---|---|---|---|
| 5,040,865 A | * | 8/1991 | Chen et al. | 385/2 |
| 6,957,019 B2 | * | 10/2005 | Gupta et al. | 398/95 |
| 7,853,153 B2 | * | 12/2010 | Kawanishi et al. | 398/183 |
| 2005/0220385 A1 | | 10/2005 | Kawanishi et al. | |
| 2009/0103924 A1 | * | 4/2009 | Kawanishi et al. | 398/115 |

FOREIGN PATENT DOCUMENTS

| JP | 2005025128 A1 | 1/2005 |
|---|---|---|
| JP | 2005031115 A1 | 2/2005 |
| JP | WO2006/006711 A1 | 1/2006 |

OTHER PUBLICATIONS

Kondo, J et al :"76-GHz Millimeter-Wave Generation Using MZ LiNbO3 Modulator With Drive Voltage Of 7Vpp And 19GHz Signal Input" MWP 2005. International Topical Meeting, Oct. 2005.
Kawanishi T. et al.: "Quadruple Frequency Double Sideband Carrier Suppressed Modulation Using High Extinction Ratio Optical Modulators For Photonic Local Oscillation". MWP 2005. International Topical Meeting Oct. 2005, pp. 1-4.

* cited by examiner

*Primary Examiner* — Daniel Petkovsek
(74) *Attorney, Agent, or Firm* — Pyprus Pte Ltd

(57) ABSTRACT

It is an object of the present invention to provide an apparatus that can obtain a multiplied harmonic signal fast and with ease, and the method using the apparatus.
The object is attained by the method for obtaining a multiple harmonic signal comprises, suppressing a different parity optical signal having parity different from fundamental optical signals; suppressing residual optical signals using an optical filter after suppressing the different parity optical signal; and obtaining the frequency difference component using the fundamental optical signals, and the device realizing the method.

4 Claims, 11 Drawing Sheets

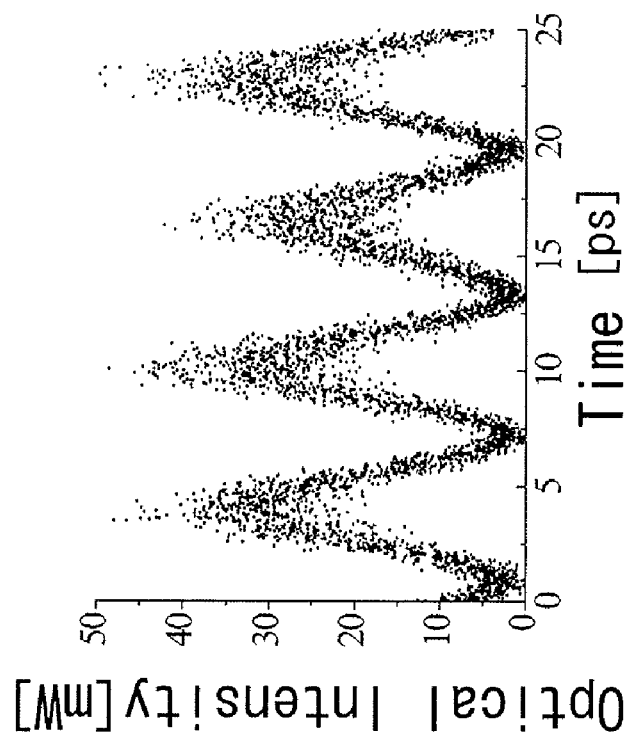
Fig. 11 (B)
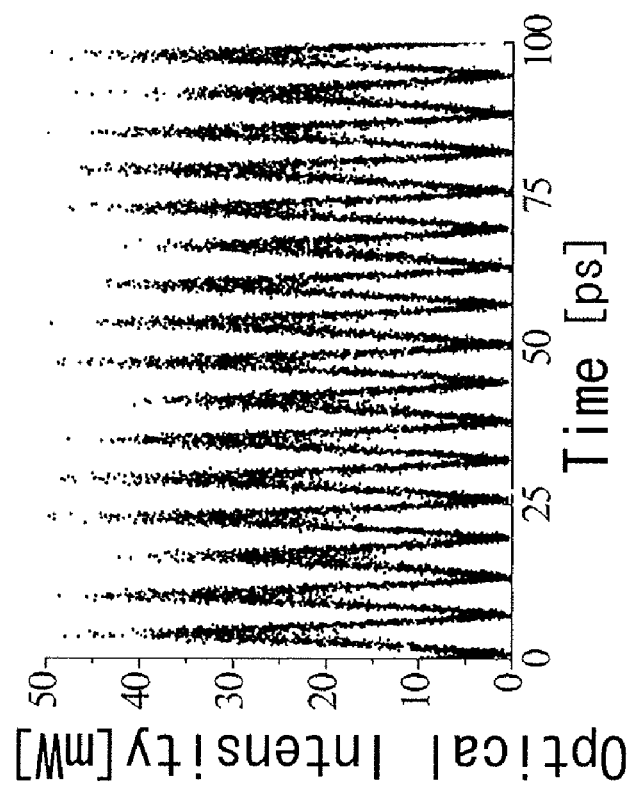
Fig. 11
Fig. 11 (A)

HIGH-SPEED MULTIPLIED SIGNAL GENERATING METHOD AND DEVICE

BACKGROUND OF THE INVENTION

1. Field of the Invention

The present invention is directed to a fast multiplied harmonic signal generating device and so on. The present invention further relates to a fast multiplied harmonic signal generating method. Firstly, the one embodiment of the method suppresses even order components by adjusting bias voltage. Next, the method suppresses a 0th order component using a filter so as to obtain ±2nd order components. Finally, the method obtains 4th harmonic wave component the frequency of which is 4 times that of a modulating signal's. Further, the present invention relates to a fast multiplied harmonic signal generating method obtaining multiplied harmonic signal, including 6th harmonic wave component and 8th harmonic wave component, using similar principle as above. The present invention is further directed to an apparatus that can attain the above methods.

2. Description of the Related Art

Recently, various kinds of multiplied harmonic signal generating techniques were proposed. However such techniques have problem that it can not suppress unnecessary components.

For example, the method of obtaining 2nd harmonic component by means of optical phase modulator (see the following reference 1). This technique basically uses an optical filter to suppress unnecessary components. On the other hand, the optical filter does not have strict wavelength response. Thus, it was difficult to suppress unnecessary component without fading necessary component when the frequency of the unnecessary component and that of necessary component is close. Further the characteristic of the optical filter alters reflecting surrounding temperature. Thus, when the temperature alters, it become difficult to suppress unnecessary component and it sometimes fades necessary components.

[Reference 1] Proceedings of SPIE—Volume 5579 Photonics North 2004: Photonic Applications in Telecommunications, Sensors, Software, and Lasers, John C. Armitage, Roger A. Lessard, George A. Lampropoulos, Editors, November 2004, pp. 673-679

SUMMARY OF THE INVENTION

Problems to be Solved by the Invention

It is an object of the present invention to provide an apparatus that can obtain a multiplied harmonic signal fast and with ease, and the method using the apparatus.

The present invention basically based on the following concept. It suppresses odd order components of output light by driving a Mach-Zehnder modulator in a manner that the output intensity of optical signal becomes maximum when no modulating signal is applied at first. Next, it eliminates a 0th order component from using an optical filter so as to obtain ±2nd order components. Finally, it obtain a 4th harmonic wave component using the ±2nd order components. In other words, the optical filter eliminates unnecessary components in a situation that the odd order components are suppressed enable the distance between two side bands. Furthermore, after suppressing odd order components, an optical filter which suppress the wavelength region which includes ±2nd order components makes it possible to suppress a 0th order component as well as ±2nd order components. Then it becomes possible to obtain ±4th order components. Further, using obtained ±4th order components, it becomes possible to obtain an 8th harmonic wave component. In that case, it is easy to obtain the component and suppress unnecessary components because ±3rd order components are suppressed. On the other hand, it is possible to obtain ±1st order components by adjusting bias point so as to suppress even order components. Then it is possible to obtain a 2nd harmonic wave component. Furthermore, after suppressing even order components, using the optical filter that suppresses ±1st order components, it is possible to obtain ±3rd order components, and then it becomes possible to obtain a 6th harmonic wave component.

It is not easy to obtain harmonic wave components if the extinction ratio of the optical modulator were low. A Mach-Zehnder modulator can suppress odd order components or even order components by adjusting bias points. However its suppression ratio depends on its extinction ratio. Thus, a preferable embodiment of the present invention makes the extinction ratio of the Mach-Zehnder to be increased or makes use of the Mach-Zehnder modulator that has a means for increasing its extinction ratio. Using such a method or using such a modulator, it becomes possible to obtain harmonic wave components with desirable characteristics.

The first aspect of the present invention is directed to a method for obtaining a multiple harmonic signal. The method comprises following steps. The first step is to suppress a different parity optical signal having parity different from fundamental optical signals. The fundamental optical signals are used to obtain a frequency difference component. The second step is to suppress residual optical signals using an optical filter after suppressing the different parity optical signal. The residual optical signals exist between the fundamental optical signals. The third step is to obtain the frequency difference component using the fundamental optical signals.

The second aspect of the present invention is directed to a multiplied harmonic signal generating device. The device comprises an optical modulator, a bias signal source, a modulation signal source, an optical filter, an apparatus for obtaining a frequency difference component, and a control device. The optical modulator has a high extinction ratio type Mach-Zehnder modulator. The high extinction ratio type Mach-Zehnder modulator is a Mach-Zehnder modulator which has a means for increasing an extinction ratio. The bias signal source is a signal source which is used for applying bias signal to the optical modulator. The modulation signal source is a signal source which is used for applying a modulation signal to the optical modulator. The optical filter suppresses the predetermined component of an output light outputted by the optical modulator. The apparatus for obtaining a frequency difference component obtains the frequency difference component using the output light. The predetermined component of the output light is suppressed by the optical filter. The control device controls the operating conditions of the bias signal source, the modulation signal source and the apparatus for obtaining a frequency difference component. Furthermore, the control device controls the bias signal so that it suppresses a different parity optical signal having parity different from fundamental optical signals, the fundamental optical signals being used to obtain a frequency difference component. The optical filter suppresses residual optical signals after suppressing the different parity optical signal, the residual optical signals existing between the fundamental optical signals, and the apparatus for obtaining a frequency difference component obtains the frequency difference component.

It is preferred to use a high extinction ratio modulator. Thus, a preferable embodiment of the present invention makes the extinction ratio of the Mach-Zehnder to be increased or makes use of the Mach-Zehnder modulator that has a means for increasing its extinction ratio. In other words, the present invention suppresses a different parity optical signal having parity different from fundamental optical signals and the fundamental optical signals are used to obtain a frequency difference component. Then, the invention suppresses residual optical signals using an optical filter and the residual optical signals existing between the fundamental optical signals. Thus, it can suppress the unnecessary components efficiently, even though the wavelength response of the optical filter is sharp.

Advantageous Effect of the Invention

The present invention suppress a 0th order component in condition that ±1st order components are suppressed. Then it makes possible to suppress ±2nd order components efficiently even when the frequency of the modulating signal is law, in other words, even when the wavelength difference between neighboring signals is narrow. Thereby, it becomes possible to obtain ±2nd order components with unnecessary components being suppressed at a vast frequency range. Using such ±2nd order components enables to obtain a 4th harmonic wave component with high extension ration fast. The above principle can be applied to obtain a 6th harmonic wave component or an 8th harmonic wave component.

BRIEF DESCRIPTION OF THE DRAWINGS

FIG. 11 is a graph which shows the time waveform of the 160 GHz optical signal. In FIG. 11, a horizontal axis is time [ps] and a vertical axis is optical intensity [mW]. FIG. 11(A) shows the time waveform the time span of which is 0 to 100 pico second. FIG. 11(B) is a diagram (expanded region is 0 to 25 pico second region) which expanded a part of FIG. 11(A).

Figure 1:
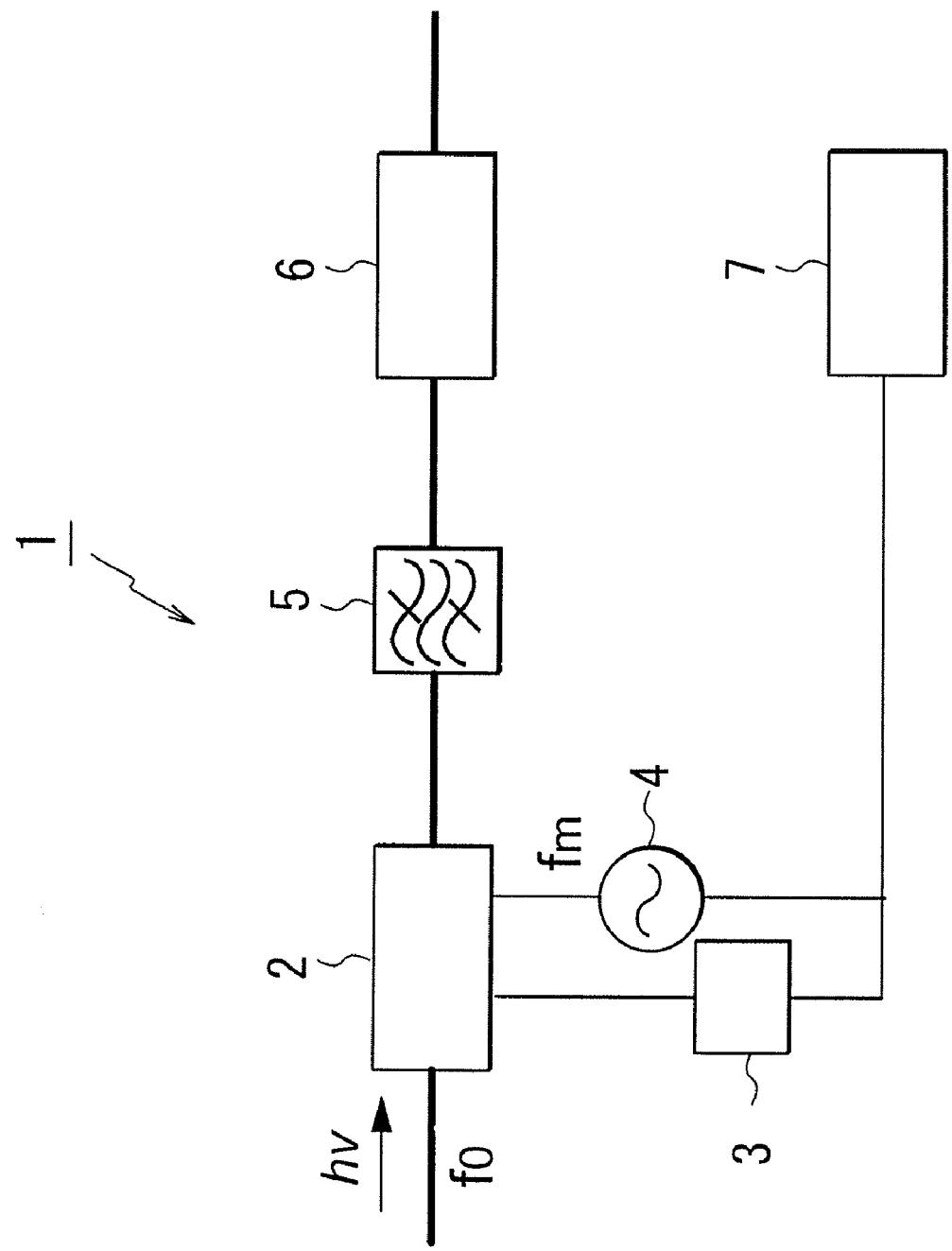
FIG. 1 is a schematic diagram showing a basic arrangement of the multiplied harmonic signal generation device of the present invention.

1 a multiplied harmonic signal generating device
2 an optical modulator
3 a bias signal source
4 a modulation signal source
5 an optical filter
6 an apparatus for obtaining a frequency difference component
7 a control device

DESCRIPTION OF THE PREFERRED EMBODIMENTS

1. The Multiplied Harmonic Signal Generating Device

The best mode for carrying out the present invention is disclosed. FIG. 1 is a schematic block diagram showing a basic arrangement of the multiplied harmonic signal generation device of the present invention. As shown in FIG. 1, the multiplied harmonic signal generating device of the present invention (1) comprises an optical modulator (2), a bias signal source (3), a modulation signal source(4), an optical filter (5), an apparatus for obtaining a frequency difference component (6), and a control device (7). The optical modulator has a Mach-Zehnder modulator. A Mach-Zehnder modulator which has a means for increasing an extinction ratio is preferred. The bias signal source is a signal source which is used for applying bias signal to the optical modulator. The modulation signal source is a signal source which is used for applying a modulation signal to the optical modulator. The optical filter suppresses the predetermined component of an output light outputted by the optical modulator. The apparatus for obtaining a frequency difference component obtains the frequency difference component using the output light. The predetermined component of the output light is suppressed by the optical filter. The control device controls the operating conditions of the bias signal source, the modulation signal source and the apparatus for obtaining a frequency difference component. Furthermore, the control device controls the bias signal so that it suppresses a different parity optical signal having parity different from fundamental optical signals, the fundamental optical signals being used to obtain a frequency difference component. The optical filter suppresses residual optical signals after suppressing the different parity optical signal, the residual optical signals existing between the fundamental optical signals, and the apparatus for obtaining a frequency difference component obtains the frequency difference component. Each element of the multiplied harmonic signal generating device of the present invention is explained bellow.

1.1 The Multiplied Harmonic Signal Generating Device

In this specification, the term "the multiplied harmonic signal generating device" means a device for obtaining the optical signal which has the frequency of the integral multiple of the modulation frequency of the moderation signal (electric signal) applied to the optical modulator.

1.2. Optical Modulator

The term "optical modulator" means a well-known optical modulator which has Mach-Zehnder waveguides. The examples of the optical modulator are an intensity modulator and a phase modulator. The optical modulator of the present invention may be any kinds of optical modulator because the present invention utilizes the high order components that are usually noise components generated in modulating optical signals. It is preferred to use the Mach-Zehnder modulator that has a means for increasing its extinction ratio.

Figure 2:
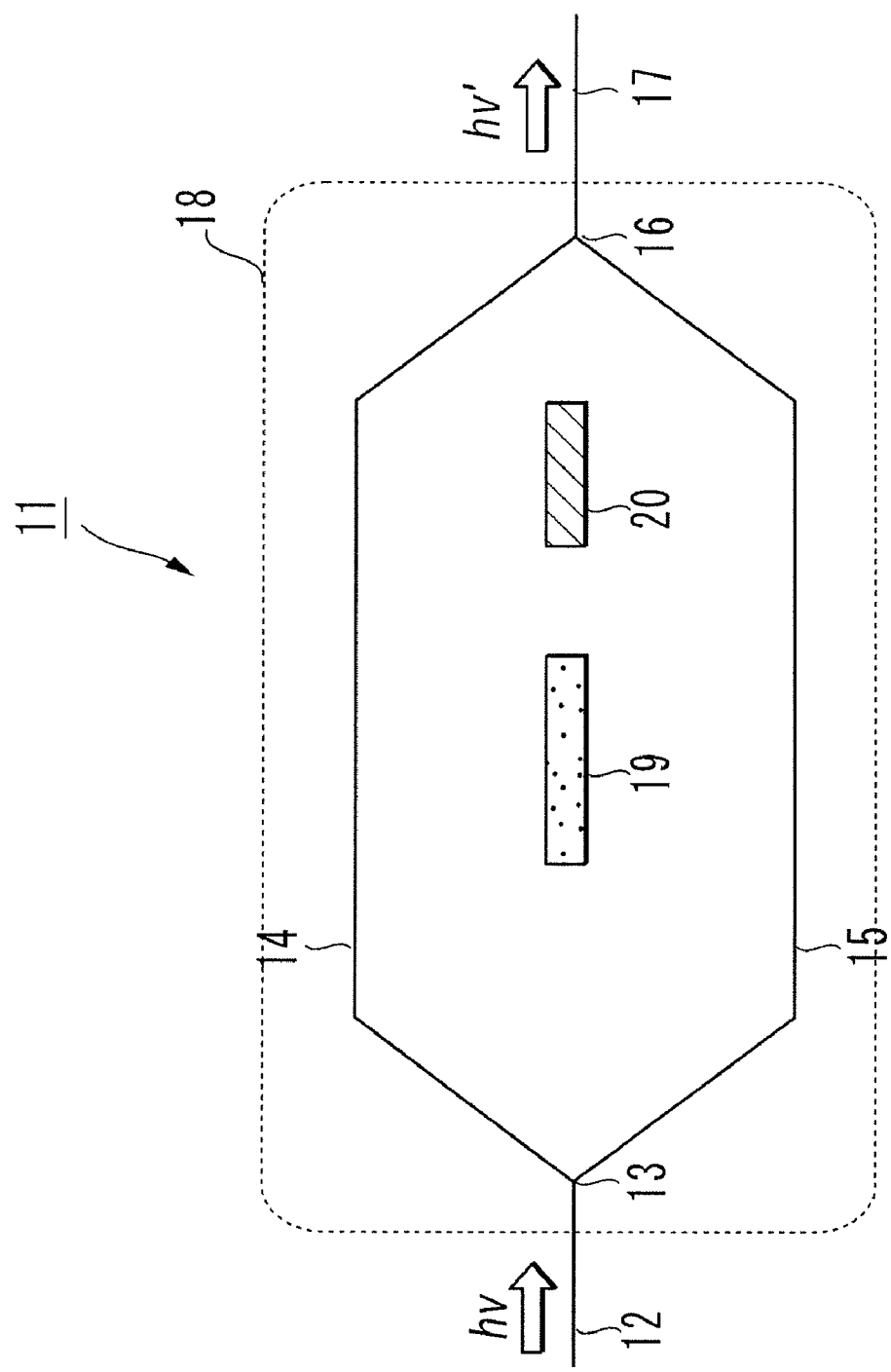
FIG. 2 is a schematic diagram showing the example of the optical modulator which has the Mach-Zehnder type waveguide.

FIG. 2 is a schematic diagram that shows the example of the optical modulator which has the Mach-Zehnder type waveguide. As shown in FIG. 2, the optical modulator (11) comprises the Mach-Zehnder type waveguide, the Mach-Zehnder type waveguide comprises an input part (12) of an optical signal, a branching part (13), the first arm (14) and the second arm (15) each of which is a waveguide on which the branched optical signal propagates, a combining part (16) at which the optical signal outputted from the first arm (14) and the optical signal outputted from the second arm (15) are combined, an output part (17) from which the optical signal combined at the combining part is output. The Mach-Zehnder modulator has a means for increasing an extinction ratio. In the FIG. 2, the element numerals 19 and 20 denote a bias electrode and a modulation electrode, respectively. Both of the electrodes are provided reparatory or one electrode may acts as bias and modulation electrode. The optical modulator can act as a phase modulator. In the present invention, the apparatus utilize high order components which usually are regarded as noise components in obtaining optical modulating signals.

The modulator can control the intensity of odd order components or even order components of the output signal by adjusting bias voltage because it comprises Mach-Zehnder waveguide. To adjust the intensity of odd order components or even order components become maximum make it possible to suppress a different parity optical signal having parity different from fundamental optical signals and the fundamental optical signals being used to obtain a frequency difference component.

Figure 3:
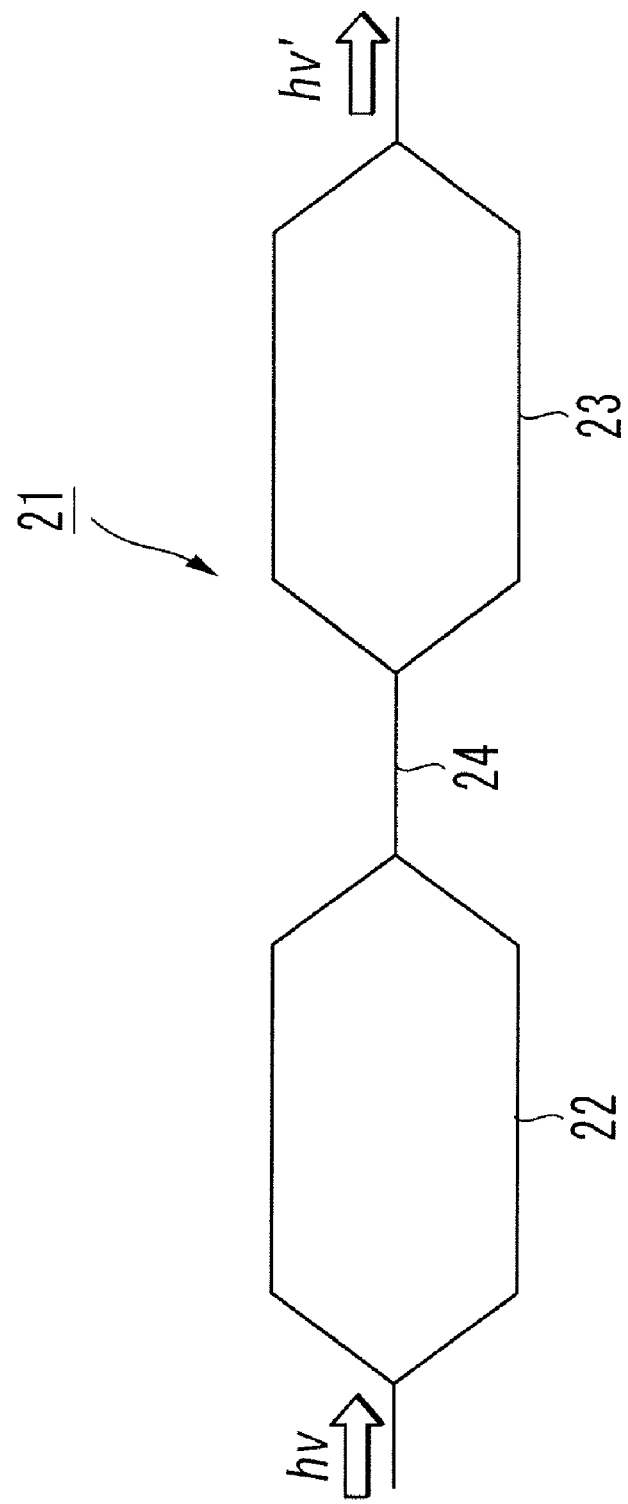
FIG. 3 is a schematic diagram showing the example of the optical modulator connected two Mach-Zehnder type waveguide in a tandem manner.

FIG. 3 is a schematic diagram showing the example of the optical modulator connected two Mach-Zehnder type waveguide in a tandem manner. The example of the optical modulator of this embodiment has a first Mach-Zehnder type waveguide (22), a second Mach-Zehnder type waveguide (23) and waveguide (23) that connects both of the Mach-Zehnder type waveguides (22, 23). It is preferred to use such an optical modulator because the modulator makes it possible to obtain high extinction ratio by utilizing the parity adjustment twice. In other words, when odd order components shall be suppressed with keeping the intensity of even order components, e.g., 0th order component and second order components as high as possible, both of the waveguides (22, 23) shall adjust bias voltage so as to suppress odd order components. The two Mach-Zehnder type waveguides (22, 23) connected in tandem is one example of a Mach-Zehnder modulator which has a means for increasing an extinction ratio.

Figure 4:
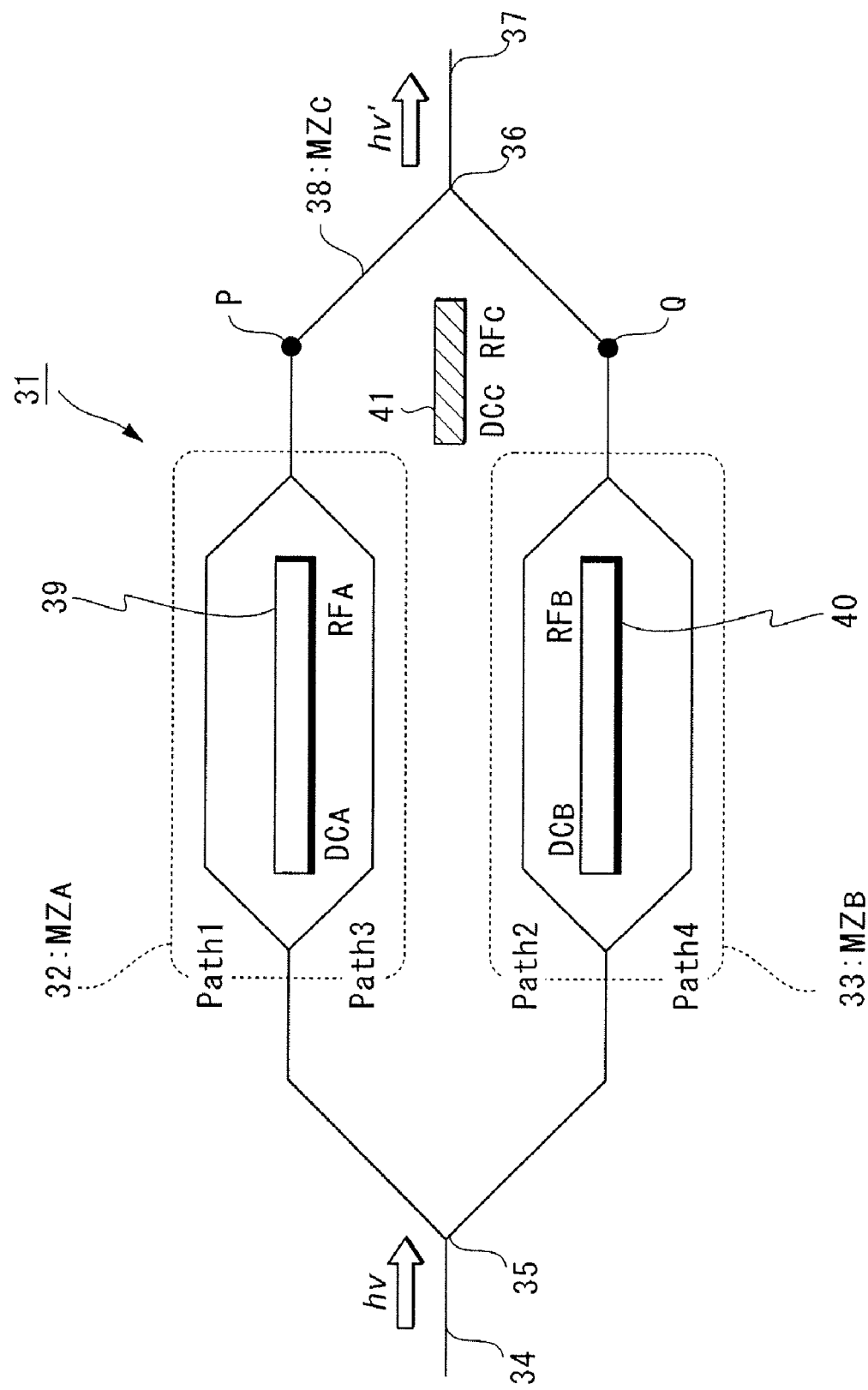
FIG. 4 is a diagram showing the example of the optical modulator which has the Mach-Zehnder type waveguide on each arm of the main Mach-Zehnder type waveguide.
Figure 5:
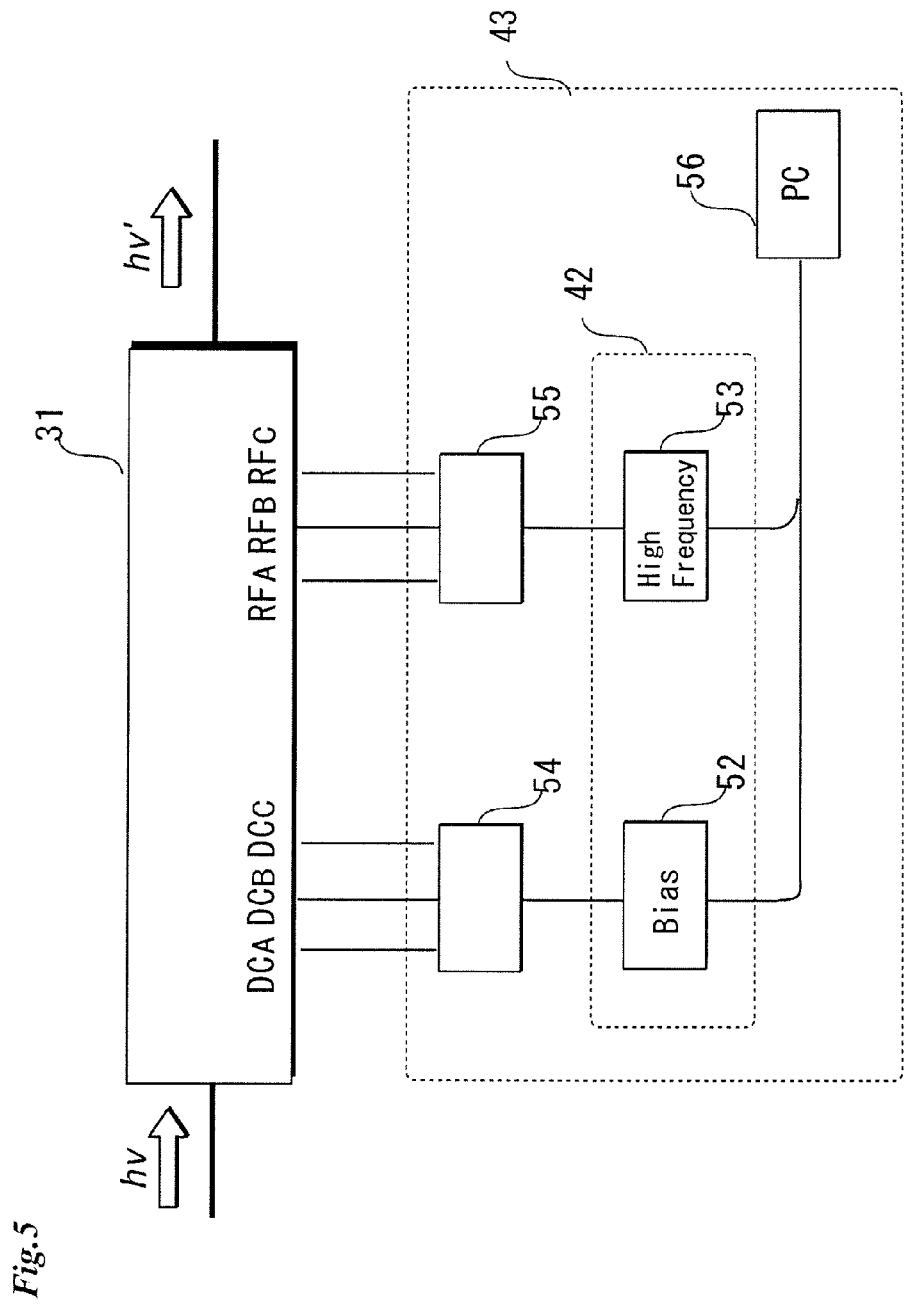
FIG. 5 is a figure showing the example of a driving system of the optical modulator shown in FIG. 4.

FIG. 4 is a diagram showing the example of the optical modulator which has the Mach-Zehnder type waveguide on each arm of the main Mach-Zehnder type waveguide. FIG. 5 is a figure showing the example of a driving system of the optical modulator shown in FIG. 4. As shown in FIGS. 4 and 5, the optical modulator (31) of the embodiment comprises a first sub Mach-Zehnder waveguide ($MZ_A$) (32), a second sub Mach-Zehnder waveguide ($MZ_B$) (33), a main Mach-Zehnder waveguide ($MZ_C$) (38), a first electrode (electrode A) (39); a second electrode (electrode B) (40); a main Mach-Zehnder electrode (electrode C) (41), a signal source (42). The main Mach-Zehnder waveguide ($MZ_C$) (38) comprises an input part (34) of an optical signal, a branching part (35), the first sub Mach-Zehnder waveguide ($MZ_A$), the second sub Mach-Zehnder waveguide ($MZ_B$), a combining part (36) and an output part (37). The input part (34) is a part at which an optical signal is input. The branching part (35) is the part at which the optical light is branched to the first sub Mach-Zehnder waveguide ($MZ_A$) and the second sub Mach-Zehnder waveguide ($MZ_B$). The combining part (36) is a part at which the optical signal outputted from the first sub Mach-Zehnder waveguide ($MZ_A$) and the optical signal outputted from the second sub Mach-Zehnder waveguide ($MZ_B$) are combined. The output part (37) is a part at which the optical signal combined at the combining part is output. The first electrode (electrode A) (39) is an electrode or electrodes of the first sub Mach-Zehnder waveguide ($MZ_A$). The second electrode (electrode B) (40) is an electrode or electrodes of the second sub Mach-Zehnder waveguide ($MZ_B$). The main Mach-Zehnder electrode (electrode C) (41) is an electrode or electrodes of the main Mach-Zehnder waveguide ($MZ_C$). The signal source (42) is an apparatus for applying either one or both of modulation signal and bias voltage to the first electrode (39), the second electrode (40) and the main Mach-Zehnder electrode (41). This specific style of Mach-Zehnder type waveguides is also one example of a Mach-Zehnder modulator which has a means for increasing an extinction ratio.

FIG. 5 is a conceptual diagram showing a signal source according to a certain embodiment of the present invention. As shown in FIG. 5, this embodiment of the signal source (42) is provided with a bias signal source (low frequency signal source) (52) and a high frequency signal source (53). The bias signal source applies bias voltage (low frequency signal) to two sub Mach Zehnder waveguides and a main Mach Zehnder waveguide. The high frequency signal source applies a radio frequency signal to two sub Mach Zehnder waveguides and a main Mach Zehnder waveguide. These signal sources are, for example, connected to adjustment mechanisms (54, 55) for adjusting phase, intensity, frequency and apply timing of an electric signal, and the phase and the like of the signal are adjusted as needed. The adjustment amount thereof may be fixed, or may be controlled by a control mechanism such as a computer (56) connected to each adjustment mechanism.

The bias signal source (low frequency signal source) (52) generates a low frequency signal. The signal is adjusted with respect to one or more of its phase, intensity, frequency or apply timing by the adjustment mechanism (54), and then three kinds of signals ($DC_A$ voltage, $DC_B$ voltage and $DC_C$ voltage) are applied to the optical modulator (31). As explained above, "low frequency" of the low frequency signal means frequency of, for example, 0 Hz to 500 MHz.

The high frequency signal source (53) generates a high frequency signal. The signal is adjusted with respect to one or more of its phase, intensity, frequency or apply timing by the adjustment mechanism (55), and then three kinds of signals ($RF_A$ voltage, $RF_B$ voltage and $RF_C$ voltage) are applied to the optical modulator (31). As explained above, high frequency ($f_m$) of the high frequency signal means frequency of, for example, 1 GHz to 100 GHz. A sinusoidal wave with a fixed frequency, for example, is an output of the high frequency electric signal source.

The bias voltage control part (43) is realized by a computer including a computer readable recording media which act as the first bias modulation means and the second bias modulation means. The first bias modulation means outputs a control signal for adjusting bias voltage applied to each sub Mach Zehnder waveguide so that the intensity of the optical signal outputted from the main Mach Zehnder waveguide is maximized. And the second bias adjusting means outputs a control signal for adjusting bias voltage applied to the main Mach Zehnder electrode so that, when the intensity of the optical signal is represented by Max, an intensity of the optical signal outputted from the main Mach Zehnder waveguide is in between 40% to 60%, both inclusive, of the Max, while the bias voltage applied to the sub Mach Zehnder waveguide is kept to be the same level as the one obtained in the first bias adjusting means. The above each means is implemented in a computer and the like which comprises an input device, a memory part, a computing part, a control part and an output part. The input device inputs measured value from the measurement system. The memory part stores the measured value inputted from the input device. The computing part compares the measured value stored in the memory part. The control part, following the input information from the input device, reads a control program stored in the main memory, retrieves each measured value stored in the memory part, and performs a certain control. And an output part outputs a direction on the bias voltage to the signal source based on the computing result from the computing part.

Instead of the second bias adjusting means, the bias voltage control part may contain a third bias adjusting means, which adjusts the bias voltage of the main Mach Zehnder electrode so that an output of a dithering signal element is maximized by applying a dithering signal as a bias voltage to the main Mach Zehnder electrode, while the bias voltage applied to the sub Mach Zehnder waveguide is kept to be the same level as the one obtained in the first bias adjusting means. The dithering signal may be generated by the second bias modulation means with a dithering generation circuit which applies the dithering processing to the staircase wave signal. For example, by applying m times of dithering to a staircase wave of n steps, the number of steps of the staircase wave becomes (n times m), enhancing the comparative accuracy of the staircase wave signal without increasing the number of steps of the frequency. A dithering generation circuit, for example, includes a feedback frequency divider (DIV) and a modulation circuit. The dithering generation circuit, for example, operates as follows. An output frequency of a voltage controlled oscillator (VCO) is provided to an output terminal and a feedback frequency divider. On the other hand, the modulation circuit receives reference input signal R, generates frequency which applies a certain cycle of fluctuation to an output frequency, and provides the output frequency to the feedback frequency divider. The feedback frequency divider changes the ratio of frequency dividing in the range of about 1% by an output from the modulation circuit in a certain cycle. And then, an output of the feedback frequency divider is provided to a phase comparison circuit. Thus, a dithering signal is generated.

Also, the bias voltage control part (13) may further include the fourth bias adjusting means for outputting a control signal. The control signal adjusts bias voltage applied to each sub Mach Zehnder waveguide so that the intensity of the optical signal outputted from each sub Mach Zehnder waveguide is maximized, while the bias voltage applied to the main Mach Zehnder electrode is kept to be the same level as the one obtained by the second or the third bias adjusting means.

The optical modulator of the present invention may control a phase of the output signal by adjusting bias voltage applied to the main Mach Zehnder electrode. In this case, in addition to the ordinary operation of the FSK modulation, the bias voltage is applied to the main Mach Zehnder electrode, thereby obtaining a phase adjusted FSK modulation signal.

Figure 6:
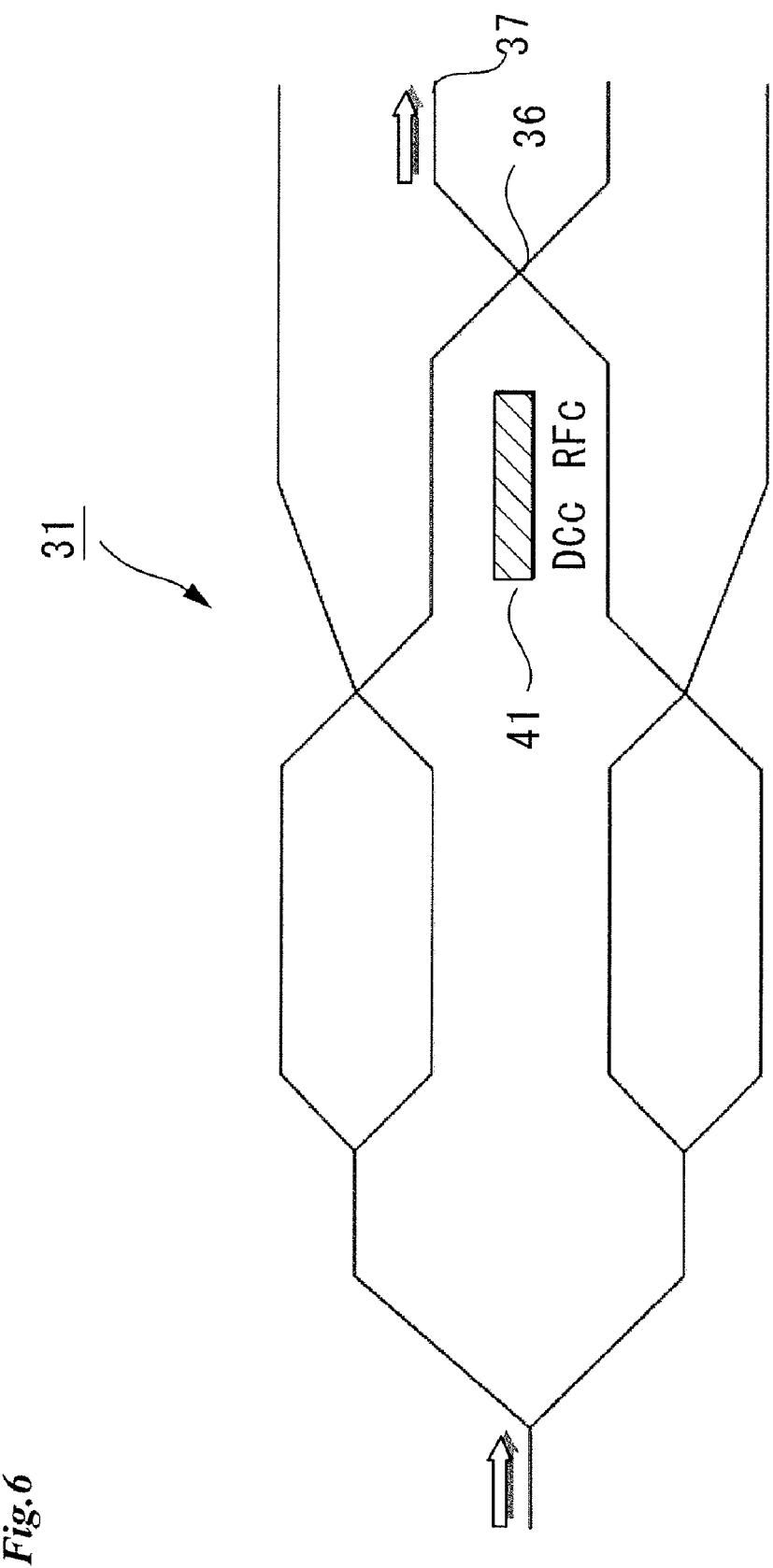
FIG. 6 is a schematic block diagram showing the optical modulator which can measure an output.

FIG. 6 is a schematic block diagram showing the optical modulator which can measure an output. In the optical modulator 31 shown in FIG. 6, an output part of at least one sub MZ waveguide has an asymmetric X-branching. An asymmetry X-branching enables the MZ waveguide to be controlled easily without influenced on noise. Moreover, when performing bias adjustment, there is a problem that it is difficult to understand whether the predetermined component was really suppressed or not. However, because the optical modulator 31 can detect output light at additional 3 output ports as well as output port 37. Thus the optical modulator can understand the best bias situation. In other words, the asymmetrical X branches and the component that has a detector at one output port of the X branches are one of the examples of a means for increasing an extinction ratio.

1.3 The Bias Signal Source

The bias signal source generates signals that have lower frequency than modulating signal. The signal is adjusted with respect to one or more of its phase, intensity, frequency or timing by the adjustment mechanism, and then applied to the bias electrodes of the optical modulator. The example of the "low frequency" of the low frequency signal is frequency of 0 Hz to 500 MHz. To adjust bias voltage can control modulation amount.

1.4 The Modulating Source

The high frequency signal source generates high frequency signals. One or more of phase, intensity, and frequency of the signals may be adjusted. Then the adjusted signal is applied to the optical modulator (1) as a modulating signal. The example of the high frequency signal is 1 GHz to 100 GHz. The output of the modulating source is a sinusoidal wave with a fixed frequency.

1.5 The Optical Filter

The optical filter is optical device that pass through or block the light which has a specific range of wavelength. The optical modulator of the present invention may apply any of already known optical filters. The optical filter shall be selected it application. An example of the optical filter is the one that is disclosed in the JP 2005-31115. The optical filter is "a wavelength-tunable optical filter, comprising: a stationary mirror, a movable mirror disposed so as to face the stationary mirror, an actuating plate for actuating the movable mirror, and a peripheral supporting portion supporting the actuating plate, the peripheral supporting portion and the actuating plate being disposed above a base layer, wherein the movable mirror is displaced by applying a voltage between electrodes provided on the actuating plate and the base layer, the actuating plate is disposed circumferentially around the movable mirror with a first opening between the actuating plate and the movable mirror and a second opening between the actuating plate and the peripheral supporting portion, and the actuating plate and the movable mirror are connected by a plurality of spaced apart first connecting portions spanning the first opening, and the actuating plate and the peripheral supporting portion are connected by a plurality of spaced apart second connecting portions spanning the second opening".

1.4 The Apparatus for Obtaining a Frequency Difference Component

The apparatus for obtaining a frequency difference component is the apparatus that obtain an optical signal that has a frequency equal to the difference of two frequency of the input lights. The apparatus for obtaining a frequency difference component is commercially available. Thus it may be possible to obtain the apparatus from marketplace. The example of the apparatus for obtaining a frequency difference component is disclosed in JP2005-25128. The apparatus comprises semiconductor optical amplitude (SOA) that has non-linear effects, and band pass filter. The apparatus obtain optical signal that comprises a frequency difference component by means of the SOA, and then it suppresses unnecessary component by means of the band pass filter.

1.7 The Control Device

The control device is a device which controls the operating conditions of the bias signal source, the modulation signal source and the apparatus for obtaining a frequency difference component. The control device is provided with input unit inputting information, an output unit outputting information, memory unit (including memory and main memory) storing information, and a computing unit such as CPU performing arithmetic operations. Information on optical intensity measured by the measurement system is inputted to the control device by the input unit, and stored in the memory. The CPU of the control device, based on a direction from a controlling program of the main memory, retrieves the information on optical intensity from the memory. The bias signals source, the modulation signal source may be connected to one or more control device.

The first aspect of the present invention is directed to a method for obtaining a multiple harmonic signal. The method comprises following steps. The first step is to suppress a different parity optical signal having parity different from fundamental optical signals. The fundamental optical signals are used to obtain a frequency difference component. The second step is to suppress residual optical signals using an optical filter after suppressing the different parity optical signal. The residual optical signals exist between the fundamental optical signals. The third step is to obtain the frequency difference component using the fundamental optical signals.

The method is explained with example to obtain 4th harmonic wave component. The fundamental optical signals are ±2nd order components and used to obtain a frequency difference component, 4th harmonic wave component. The first step is to suppress a different parity optical signal, odd order components, having parity different from fundamental optical signals. The second step is to suppress residual optical signals using an optical filter after suppressing the different parity optical signal. The residual optical signals exist between the fundamental optical signals (a 0th order component, or a 0th order component and ±1st order components). The third step is to obtain the frequency difference component, 4th harmonic wave component, using the fundamental optical signals, ±2nd order components. When the frequency of the modulating signal applied to the optical modulator be 40 GHz, it is possible to obtain an optical signal that has 160 GHz frequency. Each step is explained more detail bellow.

First, MZ modulator is driven by sinusoidal waves at the full bias mode so as to obtain an output signal the odd order components of which are suppressed. Then it becomes possible to obtain the output signal which has a maximum intensity of a 0th order component and ±2nd order components, with ±1st order components and ±3rd order components suppressed. Full bias point means the bias situation, on which the transparency of an optical modulator becomes max, in other words, the intensity of the output signal becomes maximum. Eliminating the 0th order component by the optical filter makes it possible to obtain the optical signal that mainly comprises ±2nd order components. It corresponds to intensity modulation using modulation signal that has frequency 4 times of the current modulation signal. The optical filter usually does not have sharp response to wavelength. In other words, the blocking wavelength region and the passing wavelength region are not change drastically. However, the above method to not need to suppress ±1st order components. Thus, even if one uses the optical filter that cannot suppress ±1st order components, he or she can suppress unnecessary components without suppressing ±2nd order components.

Optical filter which blocks the range including ±2nd order components after suppressing odd order component makes it possible to suppress ±2nd order components as well as a 0th order component. Then, it is possible to obtain ±4th order components. Using such ±4th order components enables to obtain an 8th harmonic wave component. In this case, because ±3rd order components have already been suppressed, it is easy to suppress unnecessary components with high accuracy. On the other hand, when even order components are suppressed by adjusting bias voltage, ±1st order components are obtainable. Using such ±1st order components enables to obtain an 2nd harmonic wave component. Further, using an optical filter which blocks the range including ±1st order components enable to obtain ±3rd order components. Using such ±3rd order components enables to obtain a 6th harmonic wave component.

It is not easy to obtain harmonic wave components if the extinction ratio of the optical modulator were low. Thus, a preferable embodiment of the present invention makes the extinction ratio of the Mach-Zehnder to be increased or makes use of the Mach-Zehnder modulator that has a means for increasing its extinction ratio. Using such a method or using such a modulator, it becomes possible to obtain harmonic wave components with desirable characteristics.

2. Bias Adjusting Method of the Present Invention 2.1. First Bias Adjusting Step The optical modulator that has high extinction ratio is preferred to execute the method of the present invention. Further it also desirable to drive the modulator in a manner that the extinction ratio of the modulator becomes as high as possible. Thus, one preferred embodiment of the present invention is to obtain harmonic wave component after the extinction ratio becomes as high as possible by adjusting bias voltage. The following method for adjusting bias voltage is based on the optical modulator shown in FIG. 4. The control apparatus, which comprise a voltage control part, can attain the bias adjustment and therefore is one of the examples of a means for increasing an extinction ratio.

The first bias adjusting step is one for adjusting bias voltage of each MZ waveguide so as to maximize an intensity of an optical signal outputted from the main MZ waveguide. In this step, the bias voltages of the electrode C and the two sub MZ electrode is adjusted so as to increase the output from the main MZ waveguide (preferably increased as much as possible, more preferably maximized). Since the main MZ waveguide is connected to a measurement system not shown in figures, the bias voltage applied to each MZ electrode may be adjusted by observing output levels of the measurement system. It is to be noted that "the maximum output" is not in a strict sense of the word, but is the maximum level when each bias voltage is changed in, for example, 5-100V. It may also be the maximum level of the samples performed in about 1-10V interval.

The measurement system may be connected to a power supply system providing each bias voltage via a control device, and each bias voltage may be controlled so that an optical intensity measured by the measurement system is increased. The control device is provided with an input part, an output part, a memory part (including memory and main memory), a computing part, and a control part, the input part inputting information, the output part outputting information, the memory part storing information, and the computing part such as CPU performing arithmetic operations or controls. Information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from a controlling program of the main memory, outputs a signal changing bias voltages applied to any one of or two or more of electrodes from the output part. This process changes the intensity level of output light. The control device, retrieving the information and comparing it to the former optical intensity, outputs a direction of changing bias voltages so as to increase the optical intensity from the output part. A power source which received this output signal, based on the direction, changes voltage levels applied to each electrode, thereby increasing the optical output.

2.2 Second Bias Adjusting Step

The second bias adjusting step is one for adjusting bias voltage applied to the main Mach-Zehnder electrode, the bias voltage being adjusted so that, when the intensity of the optical signal observed in the first bias adjusting step is represented by Max, an intensity of the optical signal outputted from the main Mach-Zehnder waveguide is in between 40% to 60%, both inclusive, (preferably half) of the Max, while the bias voltage applied to each sub Mach-Zehnder waveguide is kept to be the same level as the one obtained in the first bias adjusting step.

The voltage control part outputs a direction to maintain bias voltage applied to each sub MZ waveguide at the same level as the one obtained in the first bias adjusting step. Following the direction, the signal source maintains the bias voltage applied to each sub MZ waveguide at a fixed level. The voltage control part, on the other hand, observes an intensity of the optical signal outputted from the main MZ waveguide, compares it to the Max, and outputs a direction to adjust the bias voltage applied to the main MZ electrode. Having received the direction, the signal source adjusts the bias voltage applied to the main MZ waveguide.

Specifically, information on optical intensity measured by the measurement system is inputted to the control device by the input part, and stored in the memory. The CPU of the control device, based on a direction from a controlling program of the main memory, retrieves information on optical intensity from the memory. Also, the CPU of the control device, based on a direction from the controlling program of the main memory, outputs a signal changing the bias voltage applied to the main MZ electrode from the output part. By doing this, the intensity level of output light changes. The control device, retrieving the information and comparing it to the former optical intensity, outputs a direction of changing the bias voltage so as to increase the optical intensity from the output part. The bias signal source which received this output signal, based on the direction, changes voltage levels applied to the main MZ electrode, thereby reducing the intensity of the optical signal from the main MZ waveguide. When the intensity of the output signal from the main MZ waveguide reaches a predetermined level such as one in between 40% to 60%, both inclusive, (preferably half) of the Max, this step is terminated, and the next step will be performed.

2.3. Third Bias Adjusting Step

The third bias adjusting step is an optional step for adjusting bias voltage applied to each sub Mach-Zehnder waveguide, the bias voltage being adjusted so as to maximize the intensity of the optical signal outputted from each sub MZ waveguide, while the bias voltage applied to the main Mach-Zehnder electrode is kept to be the same level as the one obtained in the second bias adjusting step.

The voltage control part outputs a direction to maintain the bias voltage applied to the main MZ electrode at the same level as the one obtained in the second bias adjusting step. Following the direction, the bias signal source maintains the bias voltage applied to the main MZ electrode at the same level as the one obtained in the second bias adjusting step. The voltage control part, on the other hand, observes an intensity of the optical signal outputted from each sub MZ waveguide, outputs a direction to adjust the bias voltage applied to each sub MZ electrode so as to maximize the each observed level. Having received the direction, the signal source adjusts the bias voltage applied to each sub MZ waveguide.

Specifically, information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from the controlling program of the main memory, outputs a signal changing the bias voltage applied to each sub MZ electrode from the output part. By doing this, the intensity level of output light changes. The control device, retrieving the information and comparing it to the optical intensity so far stored, outputs a direction of changing the bias voltage so as to maximize the optical intensity from the output part. The bias signal source which received this output signal, based on the direction, changes voltage levels applied to each sub MZ electrode, thereby changing the intensity of the optical signal from each sub MZ waveguide. When the intensity of the output signal from the both of the sub MZ waveguide reaches the maximum level, this step is terminated, thereby enabling to obtain an appropriate bias voltage.

2.4. Another Embodiment of Second Bias Adjusting Step

Another embodiment of the present invention is as follows. Instead of the second bias adjusting step, applying a dithering signal (minute vibration signal) as a bias voltage to the main MZ electrode and adjusting the bias voltage of the main Mach-Zehnder electrode so as to maximize an output of a dithering signal element, while the bias voltage applied to the sub Mach-Zehnder waveguide is kept to be the same level as the one obtained in the first bias adjusting step.

Working Example 1

Figure 7:
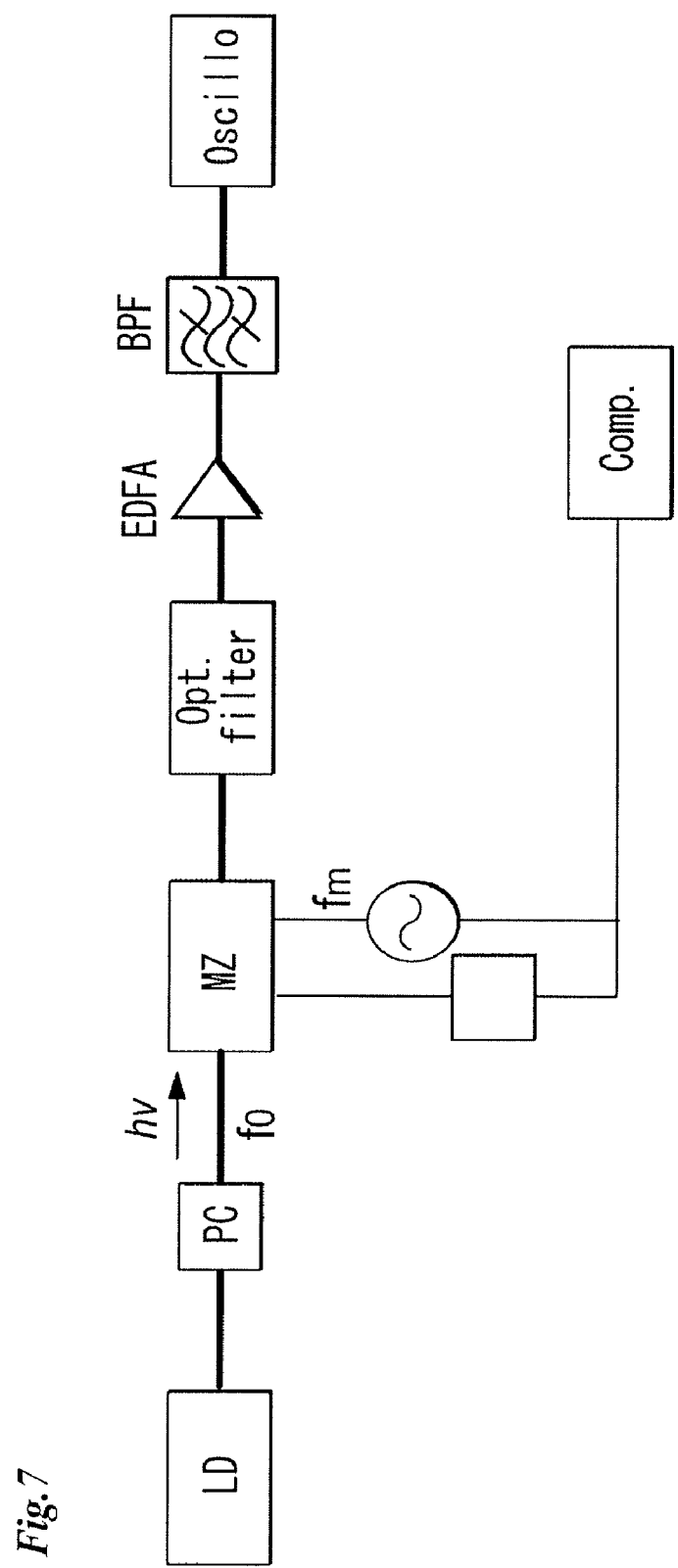
FIG. 7 is a schematic diagram of an experiment system used in the case of the operation.

Generating 4th Harmonic Wave Component by Driving MZ Modulator at Full Bias Point FIG. 7 show the schematic diagram of the apparatus used in this example. In the figure, LD indicates a laser diode, PC indicates a polarization controller, MZ indicates an optical modulator which comprises MZ waveguide, "opt.filter" indicates an optical filter, EDFA indicates one example of amplifier, BPF indicates band pass filter, Oscillo indicates oscilloscope which is used for sampling, Comp. indicates a computer.

Figure 8:
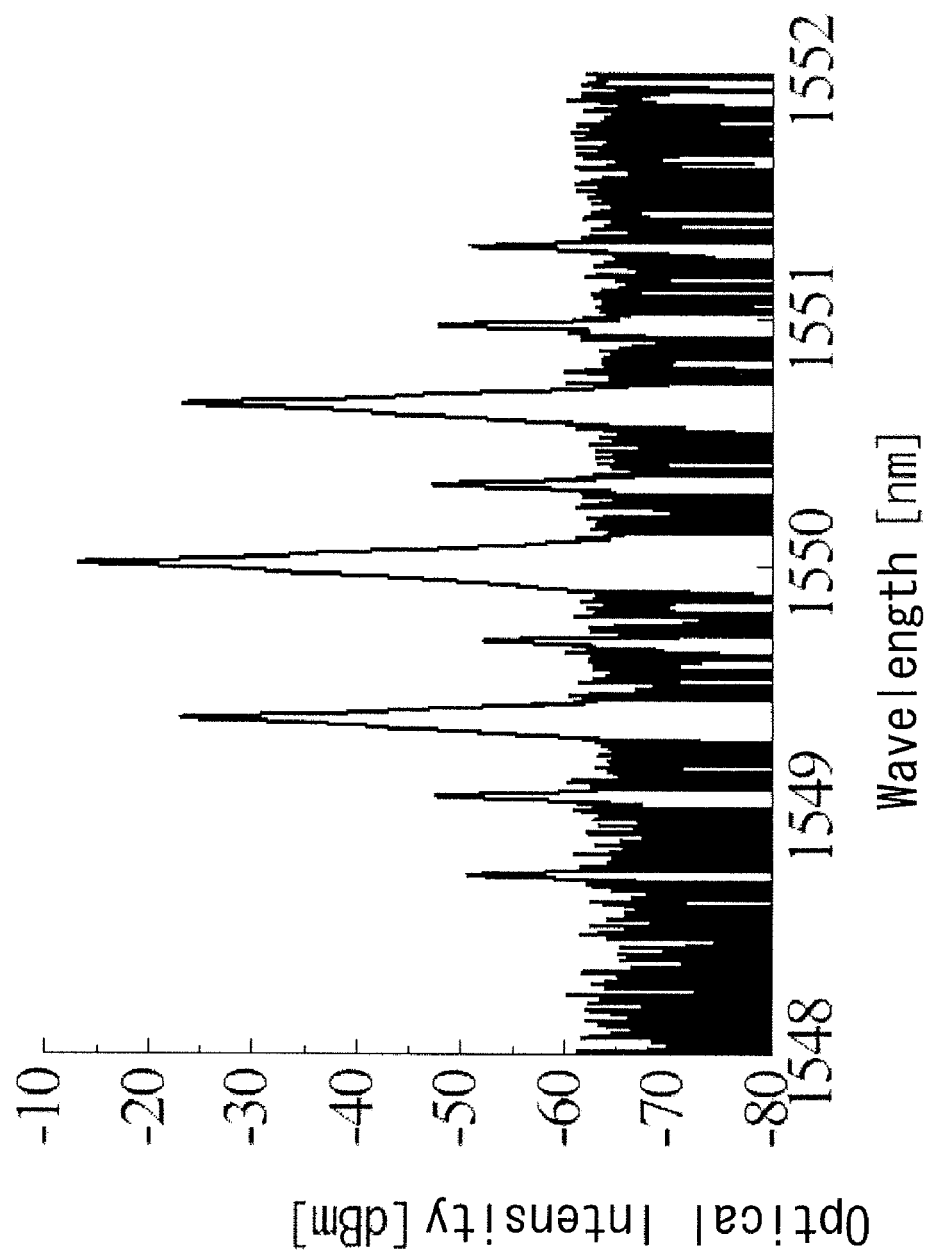
FIG. 8 is a graph which shows the optical signal generated by suppressing the ±1st order components.

As shown in FIG. 7, the optical modulator of this example comprises a main MZ waveguides and the main MZ waveguide comprises sub MZ waveguides on both of its arms. Central frequency of the input signal was 1550 nm, and modulating frequency of the modulating signal was 40 GHz. E8257D of Agilent corp. was used to attain RF signal. The modulator was driven at full power mode of 16 dBm. The signal was branched by the 10 dB coupler to generate a trigger signal. After passing variable delay, both of the branched signals are amplified by means of 40 GHz Amp Spacek lab model SP 394-3030. After passing bias T the signals were applied to the optical modulator. The intensity of the RF signal at the input port was about 26 dBm. The delay was controlled so that ±1st order components were suppressed in good valance in a full bias situation with sub MZ being 100% on state. Then, bias voltage of one of the sub MZ waveguides was adjusted so as to increase the extinction ratio. Finally, the intensity of the ±1st order components became smaller. FIG. 8 show spectrum of at such a situation. FIG. 8 is a graph which shows the optical signal generated by suppressing the ±1st order components. In the figure, the horizontal axis indicates wavelength [nm] and the vertical axis indicates optical intensity [dBm].

Figure 9:
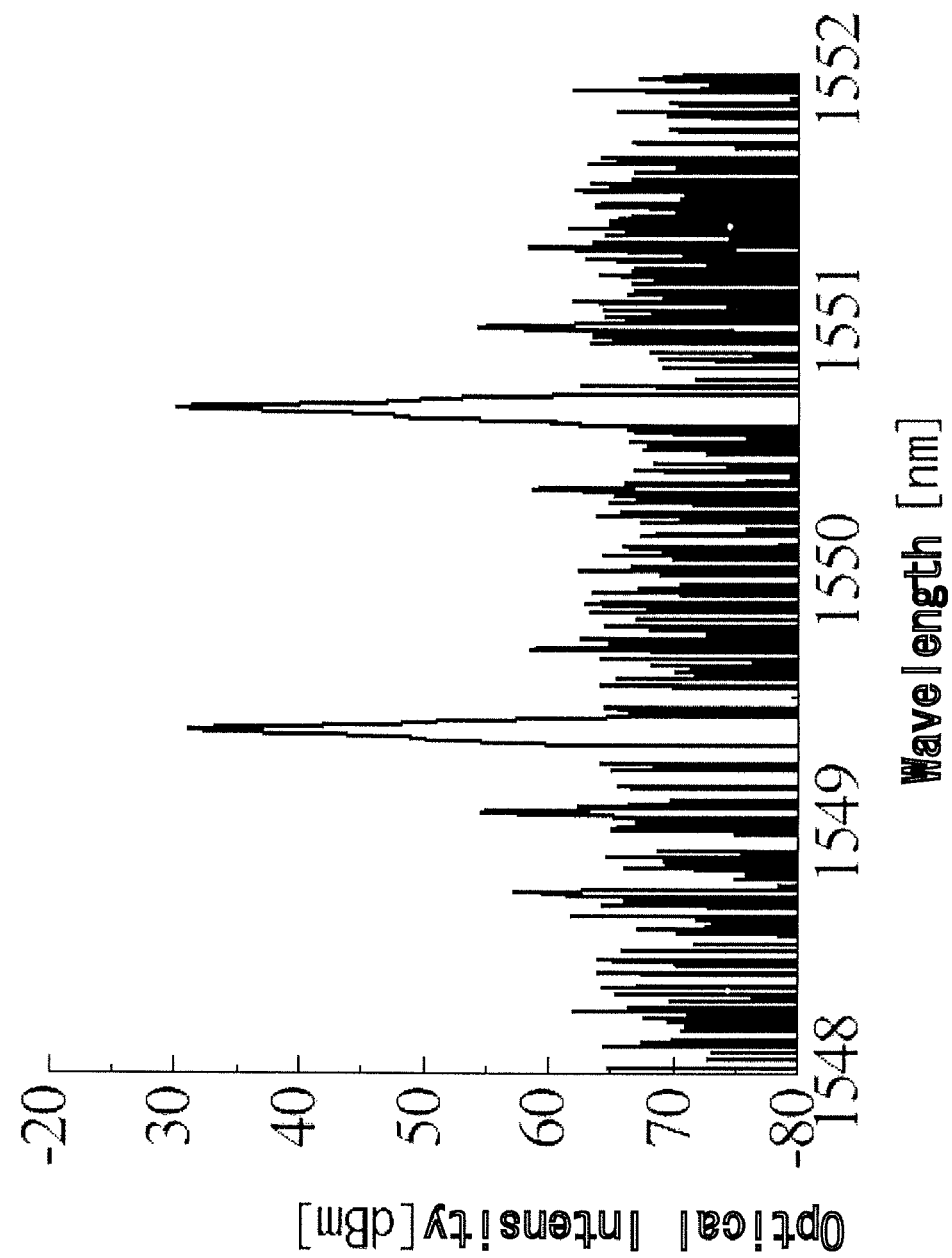
FIG. 9 is a graph which shows the optical signal generated by suppressing the career component (0th order component) after suppressing ±1st order components.
Figure 10:
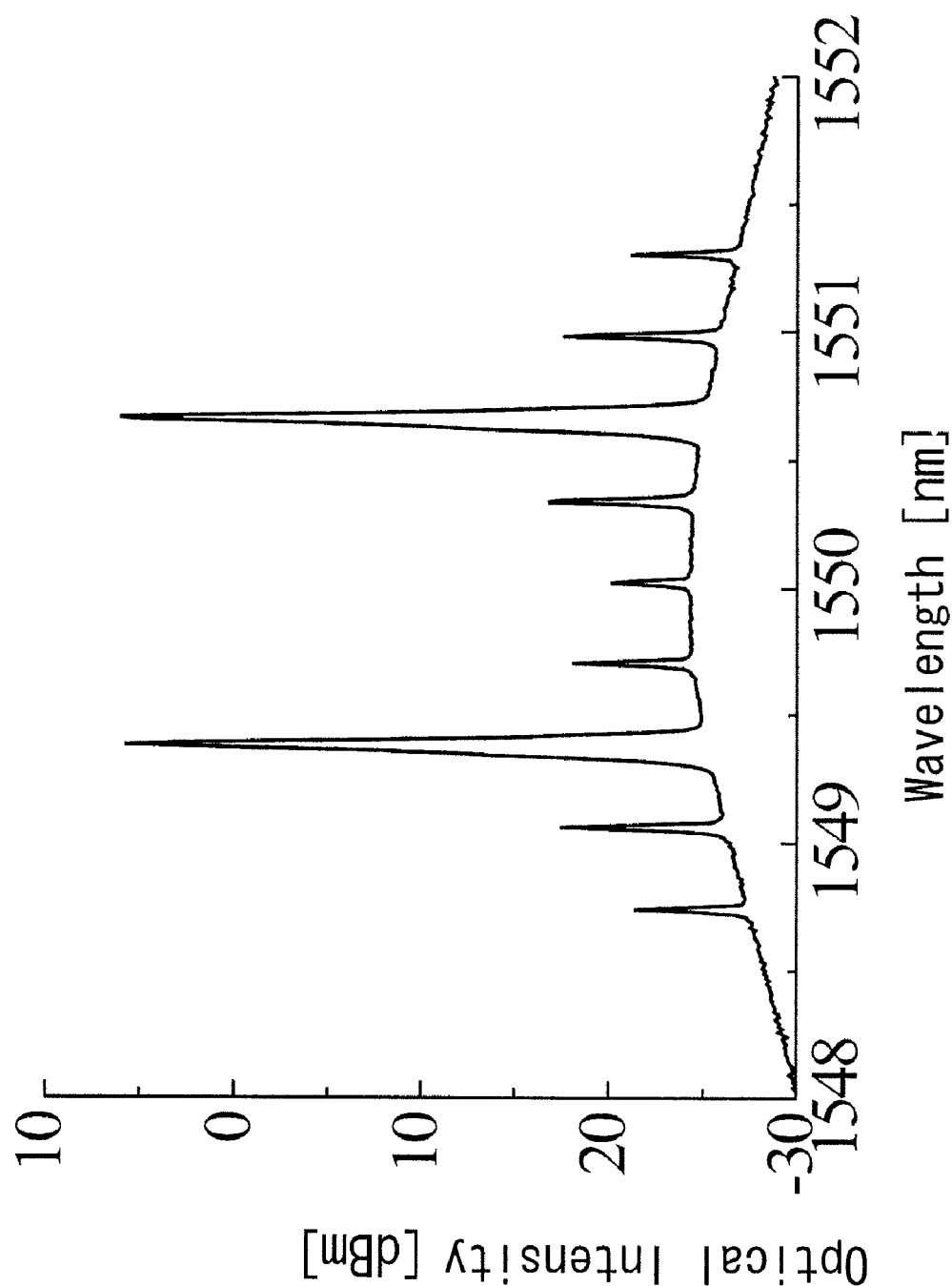
FIG. 10 is a graph which shows the optical signal after BPF.

The components that had close wavelength of that of the carrier signal, 1550 nm, were eliminated by Optical channel controller, Peleton QTM050C. FIG. 9 is a graph which shows the optical signal generated by suppressing the career component (0th order component) after suppressing ±1st order components. In the figure, the horizontal axis indicates wavelength [nm] and the vertical axis indicates optical intensity [dBm]. Output signal from QTM050C was amplified by EDFA, FITEL ErEA1224, and then the signal was transmitted to the optical sampling oscilloscope, ANDOAQ7750, via variable 5 nm BFP. The balance of the two components ware adjusted using the BFP and oscilloscope. Obtained signal is depicted in FIG. 10. FIG. 10 is a graph which shows the optical signal after BPF. In the figure, the horizontal axis indicates wavelength [nm] and the vertical axis indicates optical intensity [dBm]. As shown in the FIG. 10, the frequency interval between the main two components (±2nd order components) was 160 GHz, which is 4 times as large as that of modulating signal, 40 GHz. FIG. 10 indicates that the method of present invention enables to obtain optical spectrum unnecessary components were well suppressed even though components other than ±2nd order components were not perfectly suppressed.

Time waveform of the frequency difference component obtained using the obtained fundamental optical signals are shown in FIG. 11. FIG. 11 is a graph which shows the time waveform of the 160 GHz optical signal. In FIG. 11, a horizontal axis is time [ps] and a vertical axis is optical intensity [mW]. FIG. 11(A) shows the time waveform the time span of which is 0 to 100 pico second. FIG. 11(B) is a diagram (expanded region is 0 to 25 pico second region) which expanded a part of FIG. 11(A). FIG. 11(B) indicates that the 4th harmonic wave component obtained has tidy waveform.

This working example shows that it is possible to obtain optical signal the frequency of which is 160 GHz when driving 40 GHz using ±2nd order components, by driving a high extinction ratio type Mach-Zehnder modulator at full bias point and by eliminating the 0th order component using an optical filter. Further, the apparatus of this example was easy to adjust the modulating frequency and driving condition and the apparatus was driven stable even after modulating frequency and driving condition were adjusted.

INDUSTRIAL APPLICABILITY

A multiplied harmonic signal generating device of the present invention and a method using the device are used in the filed of optical information communication because, e.g., the device can obtain high speed clock signal. Furthermore, the device and the method are useful in the astronomy because the device can generate super high frequency signal that is used for radio wave telescope and an apparatus for astronomical observation.

What is claimed is:
1. A multiplied harmonic signal generating method by means of a first Mach-Zehnder modulator and a second Mach-Zehnder modulator, where the first and second Mach-Zehnder modulators are high extinction ratio type and connected in tandem, the method comprising:
suppressing odd order components of output light by driving the first Mach-Zehnder modulator in a full bias mode;
eliminating by using a first optical filter a 0th order component from the light to obtain;
a 2nd order component and a −2nd order component from the filtered light, wherein the 2nd order component and the −2nd order component enter into the second Mach-Zehnder modulator;
suppressing odd order components of output light by driving the second Mach-Zehnder modulator;
filtering optical components that are not −4th order component and 4th order component; and
obtaining an 8th harmonic wave component by obtaining a difference component between the 4th order component and the −4th order component from the filtered light, the frequency of the 8th harmonic wave component being 8 times of a frequency of a modulating signal.

2. The multiplied harmonic signal generating method of claim 1, wherein the high extinction ratio type Mach-Zehnder modulator comprises:
a first sub Mach-Zehnder waveguide ($MZ_A$);
a second sub Mach-Zehnder waveguide ($MZ_B$);
a main Mach-Zehnder waveguide ($MZ_C$) including:
an input part of an optical signal,
a branching part, the optical light being branched to the first sub Mach-Zehnder waveguide ($MZ_A$) and the second sub Mach-Zehnder waveguide ($MZ_B$) at the branching part,
the first sub Mach-Zehnder waveguide ($MZ_A$),
the second sub Mach-Zehnder waveguide ($MZ_B$),
a combining part being configured to connected to the first sub Mach-Zehnder waveguide ($MZ_A$) and the second sub Mach-Zehnder waveguide ($MZ_B$), wherein the optical signal outputted from the first sub Mach-Zehnder waveguide ($MZ_A$) and the optical signal outputted from the second sub Mach-Zehnder waveguide ($MZ_B$) are combined at the combining part,
an output part outputting the optical signal combined at the combining part, the output part being configured to be connected to the combining part;
a first electrode (electrode A) of the first sub Mach-Zehnder waveguide ($MZ_A$);
a second electrode (electrode B) of the second sub Mach-Zehnder waveguide ($MZ_B$);
a main Mach-Zehnder electrode (electrode C) of the main Mach-Zehnder waveguide ($MZ_C$);
a signal source for applying either one or both of modulation signal and bias voltage to the first electrode, the second electrode and the main Mach-Zehnder electrode.

3. A multiplied harmonic signal generating method, the method comprising:
suppressing odd order components of output light by driving a high extinction ratio type Mach-Zehnder modulator in a full bias mode; wherein the high extinction ratio type Mach-Zehnder modulator has a control unit that controls bias voltage;
eliminating a 0th order component from the light using an optical filter;
obtaining a 4th harmonic wave component by obtaining a difference component between a 2nd order component and a −2nd order component from the filtered light, wherein the frequency of the 4th harmonic wave component is 4 times of a frequency of a modulating signal;
a first bias adjusting step for adjusting bias voltage, the bias voltage being adjusted so as to maximize intensity of the optical signal outputted from the main Mach-Zehnder waveguide; and
a second bias adjusting step for adjusting bias voltage, the bias voltage being applied to the main Mach-Zehnder electrode, the bias voltage being adjusted so that, when the intensity of the optical signal is represented by Max, intensity of the optical signal is in between 40% to 60%, both inclusive, of the Max, while the bias voltage applied to the first electrode and the second electrode is kept to be the same level as the one obtained in the first bias adjusting step.

4. A multiplied harmonic signal generating method, the method comprising:

suppressing odd order components of output light by driving a high extinction ratio type Mach-Zehnder modulator in a full bias mode; wherein the high extinction ratio type Mach-Zehnder modulator has a control unit that controls bias voltage;

eliminating a 0th order component from the light using an optical filter;

obtaining a 4th harmonic wave component by obtaining a difference component between a 2nd order component and a −2nd order component from the filtered light, wherein the frequency of the 4th harmonic wave component is 4 times of a frequency of a modulating signal;

a first bias adjusting step for adjusting bias voltage, the bias voltage being adjusted so as to maximize intensity of the optical signal outputted from the main Mach-Zehnder waveguide; and a second bias voltage adjusting step for adjusting bias voltage of the main Mach-Zehnder electrode, the main Mach-Zehnder electrode being applied a dithering signal as bias voltage, the bias voltage being adjusted so as to maximize an intensity of a dithering component, while the bias voltage applied to the sub Mach-Zehnder waveguides is kept to be the same level as the one obtained in the first bias adjusting step.

* * * * *